Patented June 8, 1954

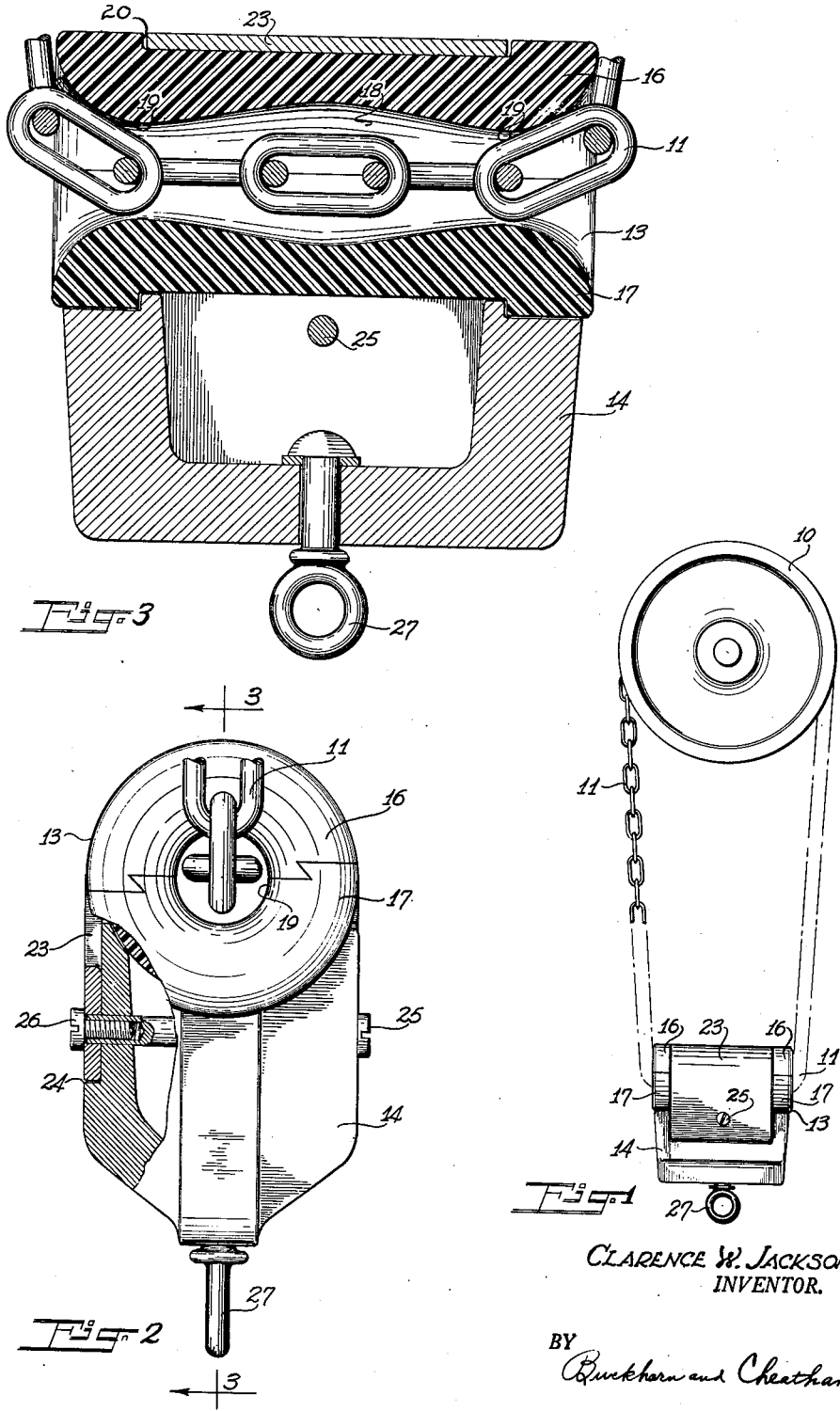

2,680,594

UNITED STATES PATENT OFFICE 2,680,594

CHAIN GUIDE

Clarence W. Jackson, San Mateo, Calif.

Application December 14, 1951, Serial No. 261,668

7 Claims. (Cl. 254—169)

The present invention relates to improvements in endless chain operated means and, more particularly, to a chain guiding member for use therewith.

The operation of hand chain operated hoists, chute gates and the like is often hindered because of the tendency of the flights of the depending loop of chain, which is manipulated by the operator, to climb and twist and tangle, especially when the chain is pulled rapidly.

It is an object of the present invention then to provide means to keep the flights of the chain separated during the operation of a hand chain hoist whereby they may easily be grasped and will not be likely to tangle. It is a further object of the present invention to provide a chain guide which will prevent the bight of the chain of a hand chain hoist from climbing during the operation thereof. Still another object is to provide a chain guide for use with hand chain hoists that will prevent the chain from twisting.

A further object of the present invention is to provide a chain guide which may be economically manufactured and easily assembled on existing hand chain hoists.

In accordance with the illustrated embodiment of the present invention, I have provided a chain guide including an elongated tubular member adapted to receive the bight of the depending loop of chain of a hand hoist manipulated by the operator. A weighting member eccentrically disposed on the tubular member and secured thereto is provided to urge the tubular member to a horizontal position whereby the flights of the chain will be held apart and taut.

The foregoing and other objects and advantages of the present invention will be more readily ascertained from inspection of the following specification taken in connection with the accompanying drawings wherein like numerals refer to like parts throughout, while the features of novelty will be more distinctly pointed out in the appended claims.

In the drawings,

Fig. 1 is a view showing the arrangement of the chain guide of the invention with a flight of chain of a chain hoist;

Fig. 2 is an enlarged end view of the chain guide of the invention broken away to show details of the construction thereof; and Fig. 3 is a cross-sectional view taken substantially along line 3—3 of Fig. 2.

Referring first to Fig. 1, there is shown therein a sheave 10 of a chain hoist or the like from which is suspended a continuous hand chain 11 provided with the chain guide of the present invention which includes a tubular chain guiding member 13 having an opening through which the bight of the chain passes and a weighting member 14.

The chain guide is shown in greater detail in Figs. 2 and 3, to which more particular reference is now made. In the disclosed embodiment the tubular chain guiding member 13 is formed of interlocking sections such as the identical portions 16, 17, which may be molded of a plastic material, for example, Bakelite. The inner surface of the tubular member 13 is shaped to conform approximately to the surface generated by a pair of slightly overlapping ogee curves revolved about the longitudinal axis of the tube, whereby the opening comprises an enlarged central portion 18 curving concavely to oppositely disposed restricted neck portions 19 spaced inwardly from the opposite ends of the tube. From the restricted neck portions 19 the surface of the opening is flared convexly outwardly to the respective ends of the tubular member 13 to form relatively wide mouths adapted to smoothly receive the chain. As clearly shown in Fig. 3, only the mouth and neck portions of the guiding member 13 bear against the chain. The enlarged central portion 18 of the opening is provided to eliminate or minimize the tendency of a chain to bind therein. Formed in the outer surface of the tubular member 13 is a peripheral groove 20.

The weighting member 14 comprises a boxlike structure preferably of a dense metal having a saddle formed on the open end thereof adapted to receive cooperatively the tubular member 13 in a seating engagement. Means are provided to secure the weighting member 14 rotatively and releasably to the tubular member 13. As shown, the weighting member 14 is provided with recesses 24 disposed in opposite sides thereof and within which are received the opposite ends of the band 23 which forms with the saddle of the weighting member an aperture adapted to receive the tubular member 14 with the band passing therearound within the groove 20. Suitable means for releasably securing the opposite ends of the band to the weight is represented by the bolt 25 and screw 26. Preferably the band is secured to the weighting member 14 in such a manner that a small amount of clearance is provided between the saddle and the tubular member when the chain guide is suspended on a chain, so that the tubular member 13 is relatively free to rotate in respect to the weighting member 14. Preferably also the surface of the groove 20 and the surface of the band 23 in contact therewith are relatively highly polished to reduce the friction therebetween.

To provide means for suspending the chain and the chain guide in an out-of-the-way position, a revolvable eyelet 27 may be provided in the base of the weighting member 14.

The manner in which the chain guide of the invention operates may be easily perceived. The weighting member 14 will urge the guiding member 13 to a horizontal position so that the flights of the chain 11 will always be urged apart and the weight imposed on the chain will keep the flights thereof taut and prevent them from climbing and tangling if the chain is moved rapidly. The surfaces of the opening through the guiding member 13 which bear against the chain will serve to prevent it from twisting during the movement thereof, while the rotational movement permitted the guiding member will allow it to follow the natural twist of the chain, if any.

The multi-piece, interlocking construction of the chain guiding member 13 facilitates its placement on existing chain hoists, and also its replacement, if necessary. The simple means afforded by band 23 for securing the weighting member 14 to the guiding member 13 also facilitates the replacement of the latter. The band 23 serves an additional function in that it prevents the portions 16, 17 of the guiding member from moving longitudinally in respect to one another.

If additional weight is desired, shot or other material of high density may be added to the recess of the weighting member.

Having illustrated and described the preferred embodiment of the invention, it should be apparent to those skilled in the art that the invention permits of modification in arrangement and detail. I claim as my invention all such modifications as come within the true spirit and scope of the appended claims.

I claim:

1. A chain guide comprising an elongated, tubular member adapted to receive a chain therethrough, the inner surface of said tubular member conforming approximately to the surface generated by a pair of slightly overlapped ogee curves revolved about the axis of the tubular member, the opening defined by said inner surface having restricted neck portions spaced inwardly from each of the opposite ends of said tubular member, said opening flaring convexly outwardly from said neck portions to relatively wide mouths at said ends, said tubular member being formed of a plurality of interlocking portions, a relatively heavy weighting member having a saddle formed on one surface thereof, and a band releasably secured at its opposite ends to said weighting member and defining with said saddle an aperture adapted to receive said tubular member, said tubular member having an external groove in which said band is received.

2. A chain guide comprising an elongated tubular member adapted to receive a chain therethrough, the inner surface of said tubular member conforming approximately to the surface generated by a pair of ogee curves revolved about the axis of the tubular member, the opening defined by said inner surface having restricted neck portions spaced inwardly from each of the opposite ends of said tubular member, said opening flaring convexly outwardly from said neck portions to relatively wide mouths at said ends, said tubular member being formed of a plurality of interlocking portions, a relatively heavy weighting member disposed eccentrically of said tubular member, and a band releasably secured at its opposite ends to said weighting member and defining therewith an aperture adapted to receive said tubular member, said tubular member having a peripheral groove within which said band is received and loosely fitting about said tubular member to permit rotational movement of said tubular member in respect to said weighting member but restraining relative longitudinal movement in respect thereto.

3. A chain guide comprising an elongated tubular member adapted to receive a chain therethrough, the inner surface of said tubular member conforming approximately to the surface generated by a pair of ogee curves revolved about the axis of the tubular member, the opening defined by said inner surface having restricted neck portions spaced inwardly from each of the opposite ends of said tubular member, said opening flaring convexly outwardly from said neck portions to a relatively wide mouth, a relatively heavy weighting member, and means revolvingly securing said tubular member to said weighting member.

4. In a chain guide of the type described, a chain guiding member comprising an elongated body having a longitudinally extending opening adapted to receive a chain therethrough, the surface of the opening conforming approximately to the surface generated by a pair of slightly overlapped ogee curves revolved about an imaginary axis extending longitudinally of said guiding member whereby the opening defined by said surface is formed with an enlarged central portion curving concavely to oppositely disposed restricted neck portions spaced inwardly from the opposite ends of said guiding member, said surface flaring convexly outwardly to the ends of said guiding member from each of said restricted neck portions to form relatively wide mouths at each of the opposite ends of said guiding member.

5. In combination with a chain hoist having a sheave and a loop of chain depending therefrom, a chain guide adapted to retain the flights of said chain in spaced-apart relation and comprising an elongated tubular member adapted to receive the bight of the chain therethrough, a weighting member, and a band releasably secured at its opposite ends to said weighting member and defining therewith an aperture adapted to receive said tubular member, whereby said tubular member may be releasably secured to said weighting member.

6. In combination with a chain hoist having a sheave and a loop of chain depending therefrom, a chain guide adapted to retain the flights of said chain in spaced-apart relation and comprising an elongated tubular member adapted to receive the bight of the chain therethrough, and a weighting member eccentrically secured to said tubular member whereby said tubular member tends to assume a horizontal position.

7. In combination with a device having a loop of operating chain depending therefrom, a chain guide adapted to retain the flights of said chain in spaced-apart relation and comprising an elongated chain guiding member having a longitudinally extending opening adapted to receive the bight of the chain therethrough, a weighting member, and means for rotatively securing said weighting member to said guiding member in eccentric relation with respect to the longitudinal axis of said opening whereby said guiding member may rotate about said axis without changing the position of said weighting member in respect to said chain.

References Cited in the file of this patent

UNITED STATES PATENTS

| Number | Name | Date |
|---|---|---|
| 162,445 | Wilcox | Apr. 20, 1875 |
| 1,889,226 | Steffen | Nov. 29, 1932 |
| 2,238,398 | Reed | Apr. 15, 1941 |
| 2,257,363 | Cochin | Sept. 30, 1941 |
| 2,347,885 | Crickmer | May 2, 1944 |